United States Patent [19]
Hochstein et al.

[11] Patent Number: 5,311,185
[45] Date of Patent: May 10, 1994

[54] SUPERVISED PERSONNEL MONITORING SYSTEM

[76] Inventors: Peter A. Hochstein, 2966 River Valley Dr., Troy, Mich. 48098; Jeffrey Tenenbaum, 6162 Wynford, West Bloomfield, Mich. 48322; Thomas G. Xydis, 1141 Chestnut, Ann Arbor, Mich. 48104

[21] Appl. No.: 938,423

[22] Filed: Aug. 31, 1992

[51] Int. Cl.$^5$ ............................................. G01S 13/78
[52] U.S. Cl. ........................................ 342/44; 342/50
[58] Field of Search ............................ 342/42, 44, 50

[56] References Cited

U.S. PATENT DOCUMENTS

| | | |
|---|---|---|
| 3,419,865 | 12/1968 | Chisholm . |
| 3,646,580 | 2/1972 | Fuller et al. ............... 342/42 |
| 3,805,265 | 4/1974 | Lester ....................... 342/44 |
| 4,494,119 | 1/1985 | Wimbush . |
| 4,549,169 | 10/1985 | Moura et al. . |
| 4,630,035 | 12/1986 | Stahl et al. ................ 342/44 X |

*Primary Examiner*—T. H. Tubbesing
*Attorney, Agent, or Firm*—Reising, Ethington, Barnard, Perry & Milton

[57] ABSTRACT

The monitoring assembly (10) monitors the location of mobile objects (12), i.e., personnel, within a structure (18). The object (12) carries a transponder (14) which periodically transmits status signals and receives command signals relating to audio control. Transceivers (16) are fixed at locations about the structure (18) for receiving the status signal producing the location signals, and transmitting commands to the transponders. The transmissions and reception occur during prescribed time windows. A controller (20) is connected to each transceiver (16) and monitors the location of transponders (14) and communication therethrough. The transponders (14) have audio capability of producing audio messages directly to the person thereof.

28 Claims, 13 Drawing Sheets

SUPERVISED PERSONNEL MONITORING SYSTEM

TECHNICAL FIELD

The invention relates to a security monitoring system, and more particularly to a system for monitoring mobile objects or personnel within a structure and determining distress and location thereof.

BACKGROUND OF THE INVENTION

Several security or location systems are available on the market which provide determination of the location of a person in response to a distress signal. However, none of the references provided all of the requirements for adaption to a secure building, such as a prison.

U.S. Pat. No. 4,494,119 issued Jan. 15, 1985 in the name of Wimbush discloses a distress radio location method and system which utilizes a plurality of receivers in order to determine the location of the transmitter based on signal strength of the transmitted signal. The receivers report the signal strength of the transmitted signal to a central station which in turn calculates the transmitter's location based on the measured signal strengths and the known locations of the receivers and dispatched a rescue unit thereto. The signals may be encoded to identify the transmitter.

U.S. Pat. No. 4,549,169, issued Oct. 22, 1985 in the name of Moura et al discloses a security system wherein a transmitter is located on the body of a person for continuously transmitting a signal wherein when the person falls into the water such transmission is stopped. A low battery condition is also transmitted by the transmitted signal. A cradle is used to recharge and synchronize the timer. The code is transmitted within a predetermined time slot which is associated with the particular unit. Therefore, the monitor, upon receiving no transmission during a particular time slot, is able to determine that such unit is not properly functioning and distress condition exist.

U.S. Pat No. 3,419,865, issued Dec. 31, 1968 in the name of Chisholm discloses a mobile emergency unit locating system wherein receivers are all synchronized to a common clock and are located on vehicles. Each vehicle or unit includes a pulse transmitter and clock to actuate a transmitter during a unique time slot. Receivers deliver information to a central comparator to determine difference to times of arrivals of the same pulse signal to compute the position of the transmitter. The receivers are periodically resynchronized by a master signal. The transmitter transmits groups of coded pulses.

SUMMARY OF THE INVENTION AND ADVANTAGES

The invention is a monitoring assembly comprising a plurality of transponder means for transmitting a data or status signal and receiving a command signal. Transceiver means receive the data signal and identify which of the plurality of transponder means is transmitting. Each of the transponder means includes timing means for establishing cycles of sequential time ranges wherein each time range is associated with each of the transponder means and occurs at least once during each cycle. The assembly is characterized by the timing means including dividing means for dividing each of the time ranges into at least two time windows for allowing reception of the command signal during one of the time windows by the transponder means and for allowing transmission of the location signal during the other of the time slots by the transponder means associated with the time range during each cycle.

FIGURES IN THE DRAWINGS

Advantages of the present invention will be readily appreciated as the same becomes better understood by reference to the following detailed description when considered in connection with the accompanying drawings wherein.

DESCRIPTION OF THE PREFERRED EMBODIMENT

Figure 1:
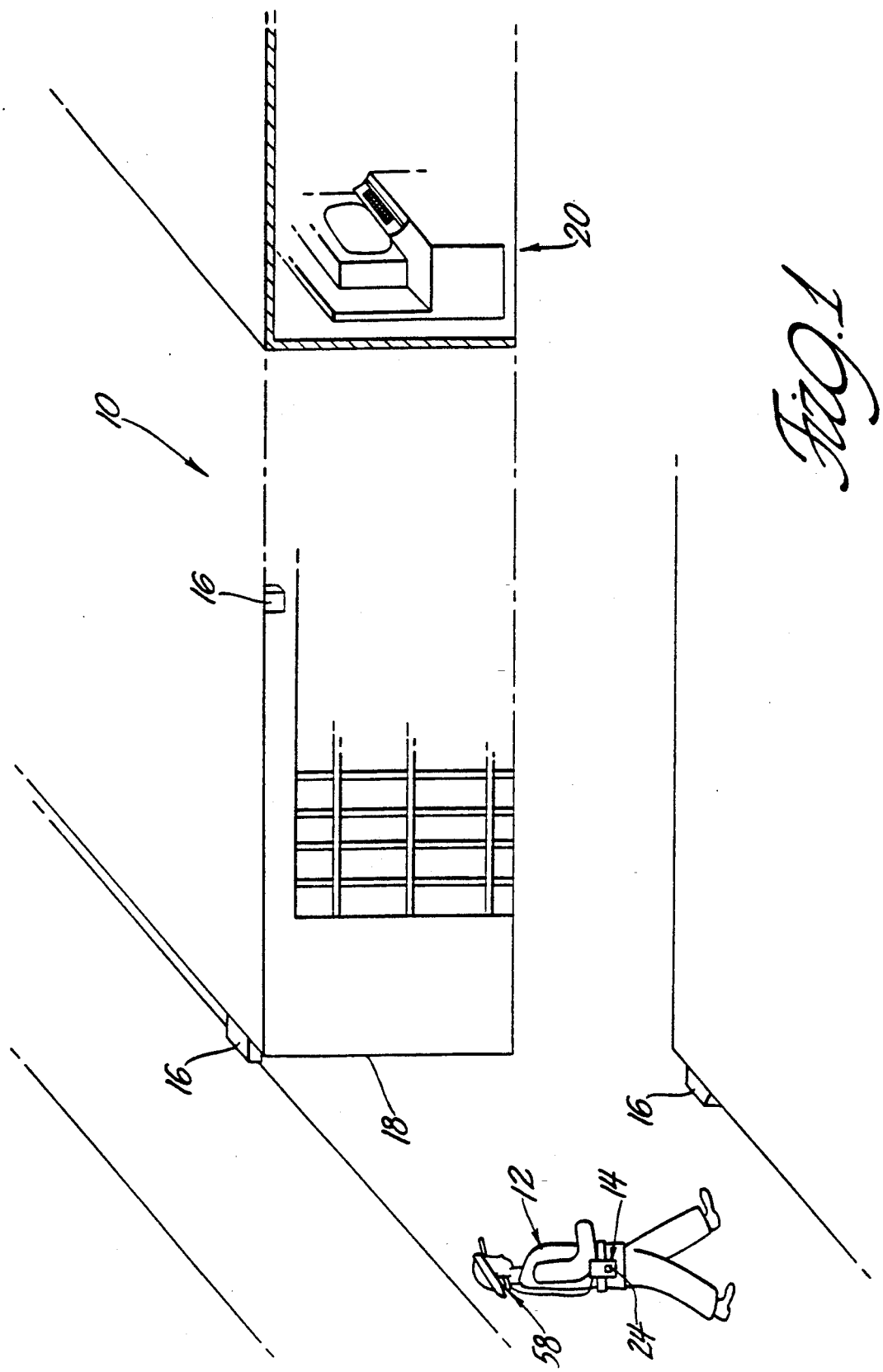
FIG. 1 is a general perspective of the subject invention.

A monitoring assembly for monitoring distress and the location of mobile objects is generally indicated at 10 in FIG. 1. The monitoring assembly 10 monitors the location of mobile objects 12, which may be personnel, guards or inanimate objects. The assembly 10 additionally monitors the occurrence of distress among one of the mobile objects or personnel 12 and may therefore respond and aid the personnel 12 by determining the location thereof.

The assembly 10 includes a plurality of transponder means 14 for transmitting a data signal. The transponder means 14 is generally a transponder attached to a mobile object or person 12. The transponder 14 is carried by a person or mobile object 12 and indicates the location and condition of distress. The monitoring assembly 10 also includes transceiver means 16 for receiving the data signal and identifying the transmitting transponder 14. The transceivers 16 are located in spaced areas about the monitored structure 18 such that upon transmission by any transponder 14, at least one transceiver 16 will receive the transmitted signal, though it is preferable to have several transceivers 16 in range receiving a transmitted signal.

The transceiver 16 measures signal strength and transmits via hardwiring an information signal to control means 20. The control means 20 monitors the location of each transponder 14 and provides indication and status of any distress or emergency condition, as will be subsequently discussed. The control means 20 can also transmit commands through the transceivers 16 to selected transponders 14 for communication with the personnel.

Figure 7:
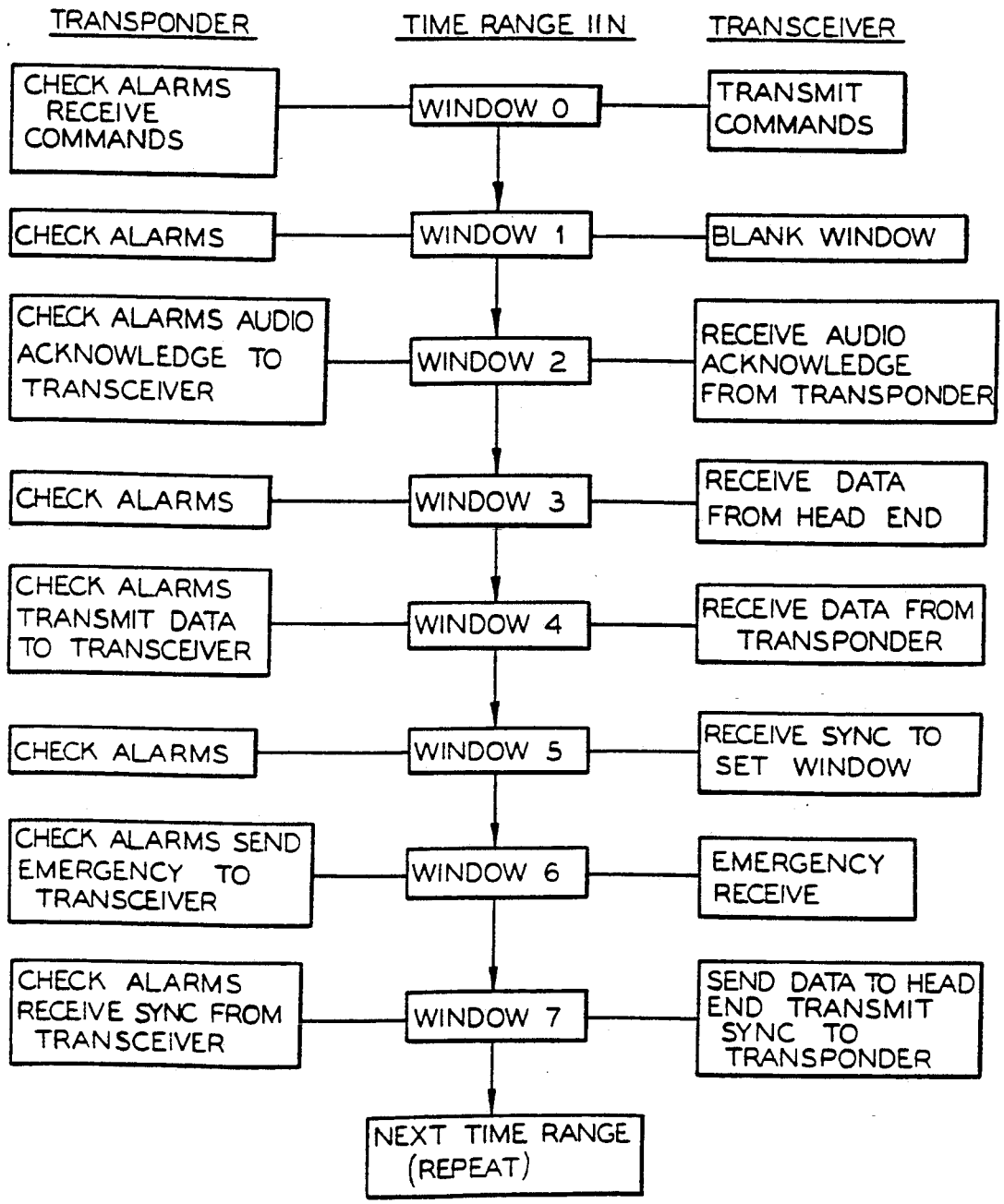
FIG. 7 is a timing diagram of a time range and associated windows for the transponders and transceivers.

Each transponder 14 is assigned a specified time range different from the other transponder time ranges within which normal data transmissions therefrom may occur, preventing the possibility of overlap and interference from other transponders 14. In other words, if there are only three transponders 14 in the system, transponder 1 would be assigned a first time range 0-1, transponder 2 would be assigned a second time range 1-2, and transponders 3 would be assigned a third time range 2-3. Each time range is divided into a plurality of time windows allowing different functions to occur within each window by the transponders 14 and transceivers 16. During each time range, only the assigned transponder 14 will transmit a status data signal during a designated window thereof. In this manner, the receiving transceivers 16 and control means 20 can identify the particular transponder 14 and associated data by the time range and window within which transmissions were received. Additionally, the transponder 14 transmits an identification code indicative of its assigned time range to further ensure correct identification. During other specified windows of the time range, transmissions to all the transponders 14 can occur along with transmissions from any transponder 14 under emergency or other conditions as subsequently discussed. An example of a time range with the time windows for the transceivers 16 and transponders 14 thereof is illustrated in FIG. 7, and will be subsequently discussed.

Figure 3:
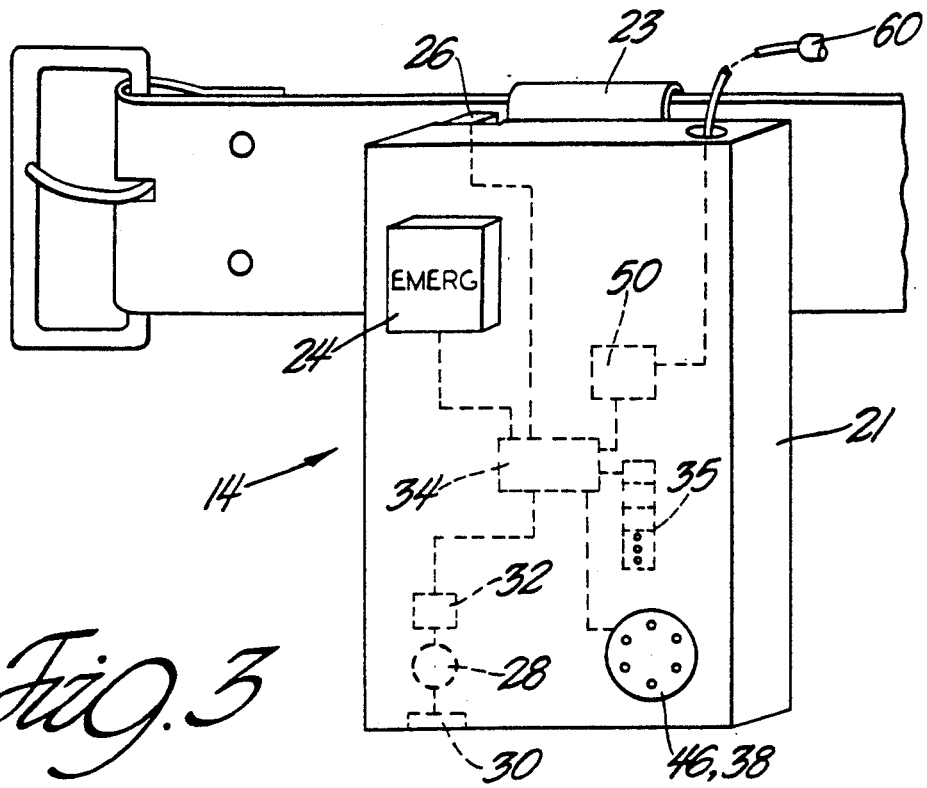
FIG. 3 is a perspective view of the transponder of the subject invention.
Figure 4:
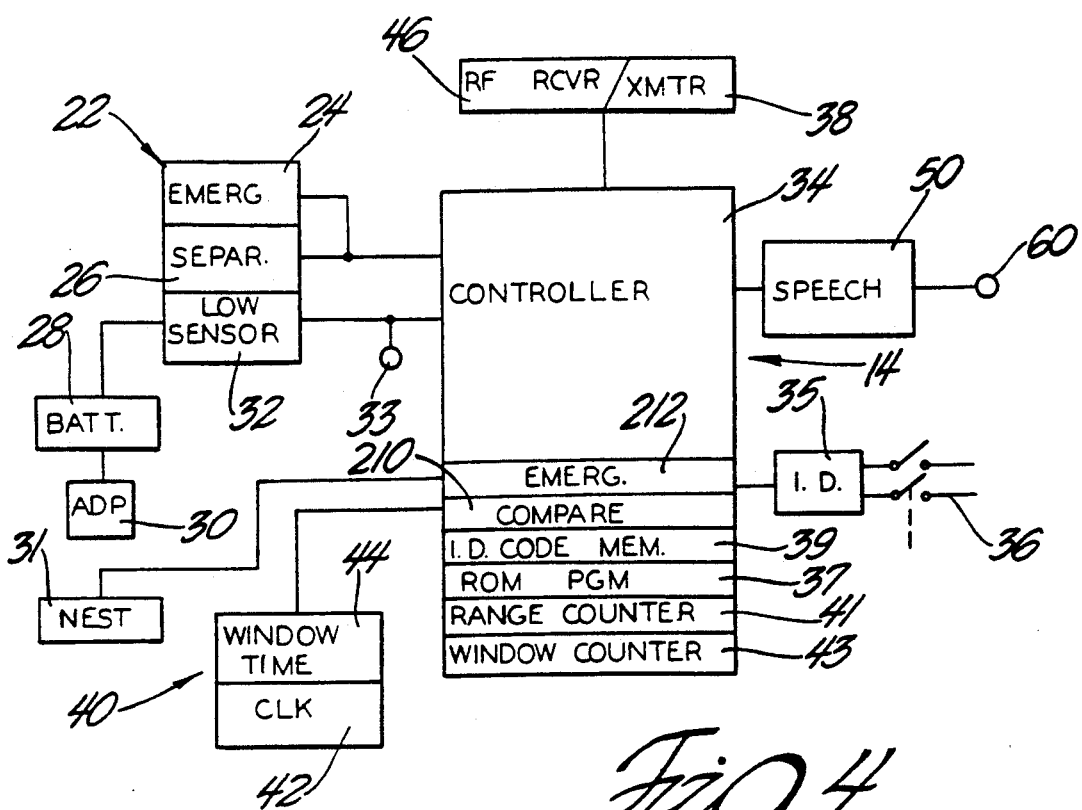
FIG. 4 is a detailed block diagram of the transponders.

The transponder 14 includes a housing 21 having a clip 23 or other attachment thereon for securing to a mobile object 12, e.g., the belt of a person, as illustrated in FIG. 3. As also illustrated in FIGS. 3 and 4, the transponder 14 includes sensing means 22 for sensing external conditions for communication to the control means 20. The sensing means 22 includes an emergency button 24 which is manually actuatable by the person 12 for producing an emergency signal. The sensing means 22 also includes a separation switch 26 for sensing separation of the transponder 14 from the object or person. The separation switch 26 also produces the emergency signal indicative of the status thereof. The separation switch 26 may be a suitable contact switch operably connected with the belt to which the transponder 14 is attached. Other types of sensors may be utilized, such as a reed switch to produce an emergency signal when the person or transponder move from vertical to horizontal. The man-down switch may generally be a tilt switch, as commonly known. It is to be understood that other types of emergency switches may be incorporated or utilized.

The transponder 14 includes a battery 28 for supplying power thereto. The battery 28 is generally rechargeable and may be recharged upon changing of the shift of each person 12 and turning in their assigned transponder 14. The battery 28 is attached to an adapter 30 which receives an a.c. voltage for charging the battery 28 from a nest 31 of the control means 20.

The sensing means 22 also includes a low battery sensor 32 for producing a low battery signal upon determination that the charge on the battery 28 has depleted below a predetermined magnitude. A green LED 33 will remain illuminated while the battery 28 is charged above the predetermined magnitude and will blink when below the predetermined magnitude.

The transponder 14 includes a transponder controller 34, which is generally a microcomputer. The controller 34 receives from shift registers 35 an identification code unique to the transponder 14. The shift registers 35 are connected to selectable switches 36 which allow manual selection of the identification code by switching and thereby coding of the switches 36. The shift registers 35 provide low and high byte serial code to the controller 34. The controller 34 includes ROM 37 for storing program code for the operation thereof according to the flow chart in FIG. 6. The controller 34 includes a RAM memory 39 for storing program variables and the total number of transponders 14 in or allotted for system for timing and cycle determination.

The transponder controller 34 receives the emergency signal and battery signal, and produces a coded data signal for r.f. transmission. The coded data signal includes a digital six byte transmission with the following coding: bytes 1 and 2 indicate a general code for system identification used on all r.f. communication; byte 3 is the high byte identification of the transponder and byte 4 is the low byte thereof; byte 5 is data consisting of bits 0-4 as open, bit 5 indicates low battery (code=0 indicates battery charged, code=1 indicates charge low), bit 6 is the emergency indicator (code=0 indicates no emergency, code=1 indicates emergency), and bit 7 is an audio acknowledge (code=0 indicates not received audio command, code=1 indicates received audio command); and byte 6 is the checksum. A radio frequency transmitter 38 receives the coded data signal and transmits the data signal via radio frequency transmission to the transceivers 16 within range of reception thereof.

The transponder 14 also includes transponder timing means 40 for establishing the time ranges and sequential time windows wherein each particular transponder 14 is associated with a particular range or number of windows. The timing means 40 comprises clock means 42 having a quartz oscillator for establishing a clock signal of a predetermined frequency, i.e., 32 KHz. The clock means 42 will cycle through seconds and tens of seconds. Window timer means 44 receives the clock signal and divides the clock signal into the time windows producing a start window signal at the start of each time window, and for producing a middle window signal at the center or middle of each window which are each sent to the controller 34. The window timer means 44 also receives the sync signal from the controller 34 to ensure synchronization with the system 10. Each window occurs for a ⅛ second duration. It is to be understood that the window duration may be easily modified.

The controller 34 maintains count of the windows and therefore time range thereof to determine functions to be performed. During the first window, the transponder 14 checks the sensor means 22 and receives commands from transceivers 16. During the second window, the transponder 14 checks sensor means 22. In the third window, the sensor means 22 is checked and the audio acknowledge transmitted during the middle of the window. In the fourth window the sensor means 22 is checked. In the fifth window the sensor means 22 is checked and the data signal is transmitted to the transceivers 16 during the middle of the window. In the sixth window by comparing means 210 of the controller 34 the sensor means 22 is checked. In the seventh the sensor means 22 is checked and the emergency data signal is transmitted by emergency means 212 of the controller 34. In the eighth window the sensor means 22 is checked and the synchronizing signal is received. The controller 34 is placed in stand-by mode to prevent power depletion between windows and after all functions have been performed during a window. The start window signal "interrupts" or wakes up the controller 34 to perform the necessary checks, as subsequently discussed. In general, transmissions and receptions by the transponder 14 occur during the middle of the window, while the checks occur at the beginning of the window. The checking of the sensor means 22 occurs at each window to ensure that an emergency condition will be detected by the controller 34 since it only wakes up every ⅛ second.

Upon reception of the fifth window interrupt, the transponder controller 34 samples each of the sensor means 22 and transmits the data signal to the r.f. transmitter 36, which in turn transmits over radio frequencies the data signal.

The controller 34 includes a range counter 41 for counting and keeping track of the present time range for comparison with the transponder number code in the switch 36 to determine when to transmit the normal data signal. Initiation of the transponder 14 sets the counter 41 to the present time range. Also included is a window counter 43 for counting one to eight to maintain count of the window in each time range indicative of functions to be performed. The counters 41, 43 are implemented through software programming in the controller 34.

Upon receiving the emergency signal or the battery signal during any window, the transponder controller 34 by means 212 sets an emergency bit and/or low battery bit in memory 39, and transmits the coded emergency signal during the emergency window of two sequential time ranges, i.e., during two sequential emergency or seventh windows, or as the data signal during its assigned time range. The transponder controller 34 need not wait until the time range of its own for emergency transmission. Transmission will occur during any emergency window and thereafter reset. Therefore, the bits remain set for 16 windows. The statuses are not reset if the emergency conditions are still detected.

The transponder 14 includes a radio frequency receiver 46 for receiving transmitted radio frequency signals from the transceiver 16. The r.f. receiver 46 is connected to and controlled by the controller 34. During a receive window, the r.f. receiver 46 is powered or enabled and receives r.f. signals from the transceivers 16. The received command signal includes an eight byte code including the following: bytes 1 and 2 indicate a general code; byte 3 supplies the command comprising reset, audio(on/off), ready to reset, and send continuous; byte 4 contains the high byte of the transponder number, byte 5 contains the low byte of the transponder number, byte 6 contains a zone number, byte 7 contains an area number, and byte 8 is the checksum. The ready to reset mode places the transponder 14 in a waiting mode to discontinue transmission which allows testing of other transponders 14. The reset field resets the transponder from the waiting mode to normal operation. The audio field sends a audio code to be communicated to the transponder 14 for audio commands to the user. The send continuous field tells the transponder 14 to continue sending sequentially during all windows, for testing thereof.

The transponder 14 may provide audible messages to the person carrying the transponder 14. The transponder 14 includes audio means 50 for audibly communicating with the person. The audio means 50 is connected to the controller 34 and communicates messages to the person. The audio means 50 generally includes an ear phone 60 for playing messages to a user thereof, as subsequently discussed.

Upon receiving the eight byte command code, the controller 34 compares the received identification number to the transponder code stored in the code switches 36 If the codes match, the transponder 14 acts on the information. The audio code of the received command signal indicates whether or not audio is to be turned on and a message communicated to the transponder user. If the audio code is set, the audio means 50 is enabled and an acknowledge bit set. During the following acknowledge transmit or third window, the controller 34 sets the audio acknowledge bit=1 in the transmitted r.f. data signal to acknowledge the audio control signal reception to the control means 20.

Audible communication by the transponder 14 is accomplished by storing predetermined massages in RAM memory 39. The message instructs the personnel that an emergency has occurred and to go a specified zone and area, which is indicated in the command signal. The controller 34 forms the message by accessing the memory 37 based on the zone and area codes, to obtain the message identifying emergency in the zone and area. For example, the zone may be the east wing of the building and the area may the cafeteria. The audio means 50 audibly communicates the message to the user.

Figure 6A:
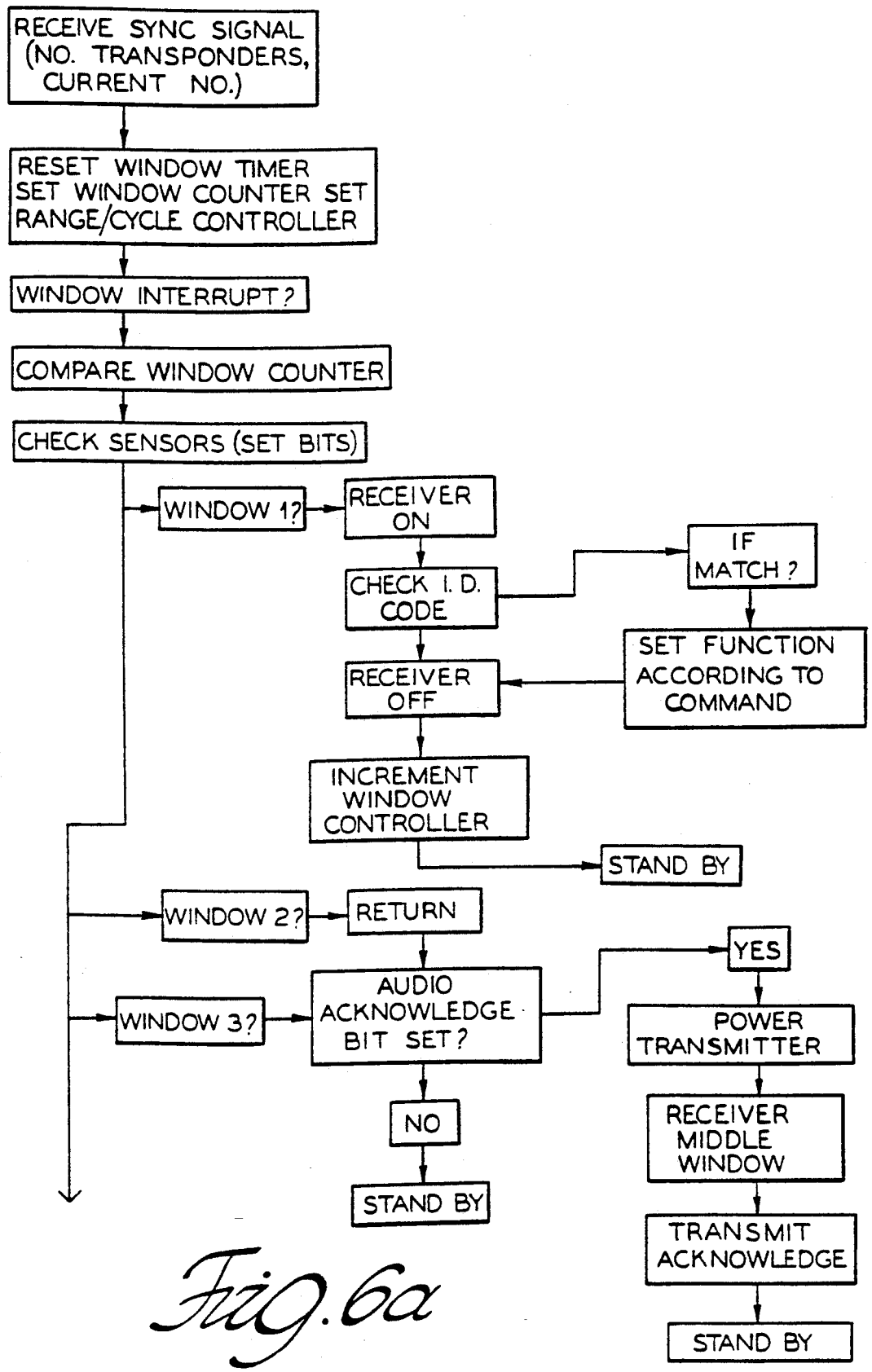
FIGS. 6a and 6b are a flow chart of the transponder controller.
Figure 6B:
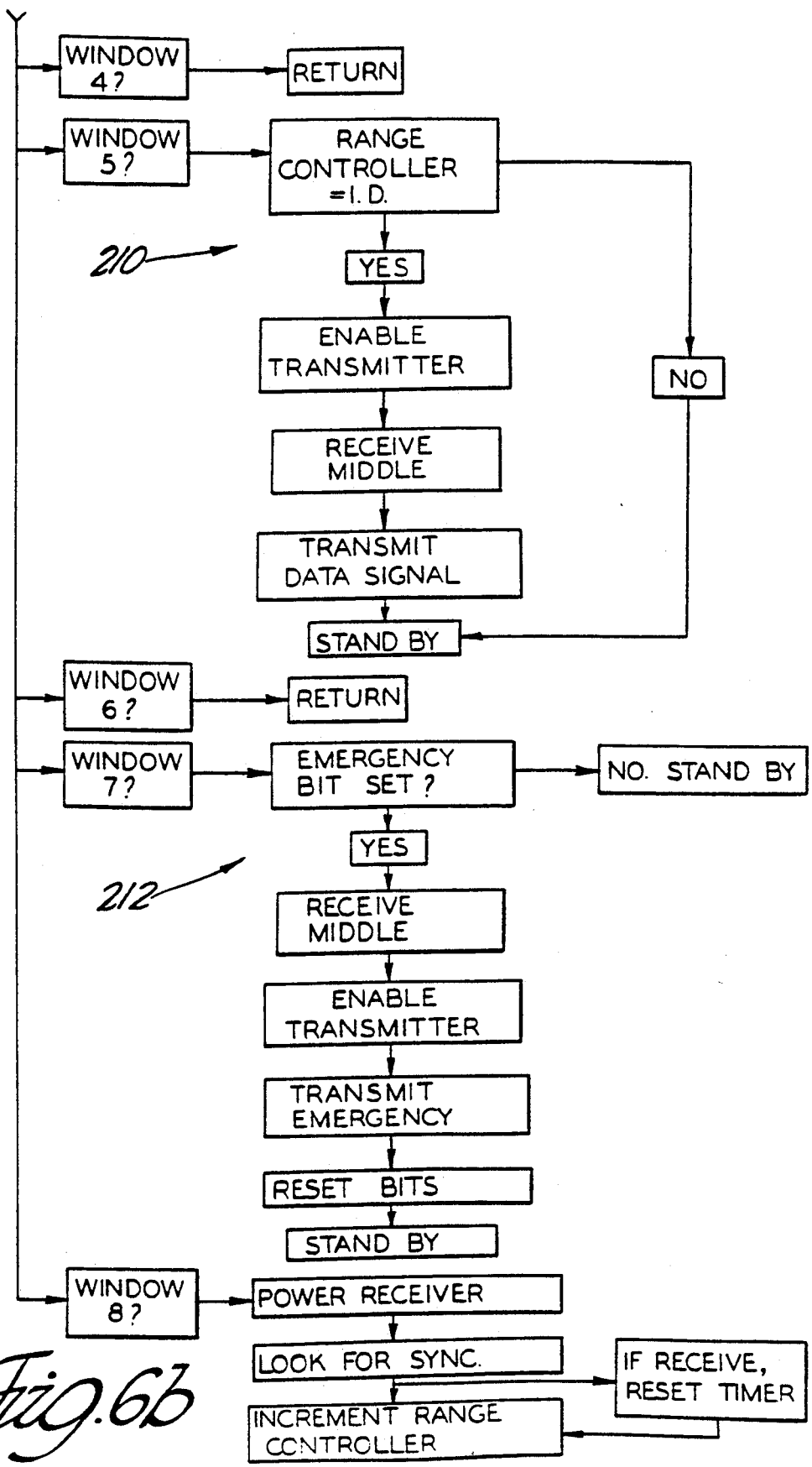

The general operation is illustrated in the flow chart of FIGS. 6a and 6b. For initiation, the controller 34 sets and starts its timing by receiving the sync signal from the control means 20 and sets the instantaneous time in the middle of window 8 in its time range. The sync signal includes the number of transponders in the system or cycle, and the current transponder number. Thereafter, the controller 34 counts and sequences through the windows and time ranges. Once initiated and synchronized, the controller 34 wakes up at the start of each time window by means 214 of the timing means 70. The controller 34 determines which window and functions are associated therewith, and whether or not the time range or set of windows belongs to or is identified with the respective transponder 14.

Upon interrupt from the first window, the controller 34 checks all sensors 22 and turns on the receiver 46 looking for transmissions during the entire window. If emergency condition exists, the emergency bits are set. Upon receiving a transmission, the controller 34 checks the received identification code, and if a match occurs with the respective internal transponder number, the controller 34 acts on the information. If there is no match, the controller 34 goes back into stand-by mode.

If the code matches the respective transponder code, the controller 34 checks the commands in byte 3 including debugging conditions, reset, ready to reset, send continuous, and also the audio condition. If the audio is turned on, a zone number and an area number in bytes 6 and 7 is provided to the transponder 14 and a message audibly communicated to the person. The audio bit is set in memory.

Upon interrupt of the second window, the controller 34 in each of the transponders 14 checks its sensor means 22 to determine an emergency condition. If emergency conditions are sensed, the emergency bits are set for subsequent transmission of the information. Thereafter, the controller, goes to standby.

Upon interrupt of the third window, the sensor means 22 is again checked again to determine if the emergency bits are to be set. Furthermore, if the audio acknowledge bit is set, the transmitter 38 is enabled and the audio acknowledge data signal is sent by the transponder 14. Thereafter, the audio acknowledge bit is reset.

Upon interrupt of the fourth window, the sensors 22 are checked and bits set accordingly.

Upon interrupt of the fifth window, sensor means 22 is checked as previously stated. The data signal is produce, the r.f. transmitter 38 is enabled, and the transmissions of the data signal are sent during the middle of the window. This data transmitted is only for and by the transponder 14 identified with the associated with time range, i.e., comparison of the counter 41 and the switch code through means 216 of the controller 78. If an emergency bit is set for this transponder 14, this information is also sent, along with low battery.

Upon interrupt for the sixth window, the controller 34 again checks the sensing means 22 and sets bits accordingly.

Upon interrupt of the seventh window, the sensor means 22 is checked, and any emergency signals by any of the transponders 14 whose emergency bits are set are transmitted during this window. The controller 34 resets the bits if the emergency signal has been transmitted during two successive time ranges. Thereafter, the controller 34 again goes into standby.

Upon interrupt for the eighth window, the sensor means 22 is again checked, and the receiver 46 is enabled and powered to receive a sync signal from the transceiver 16. If the sync signal is received, the controller 34 checks the identification thereof, and if associated with the transponder 14, and sends a reset to the window timer means 44 for synchronization.

Once the controller 34 steps through these eight windows, it repeats back to the first window and increments the range counter number for the next transponder 14 in the sequence. All transponders are synchronized.

Figure 5:
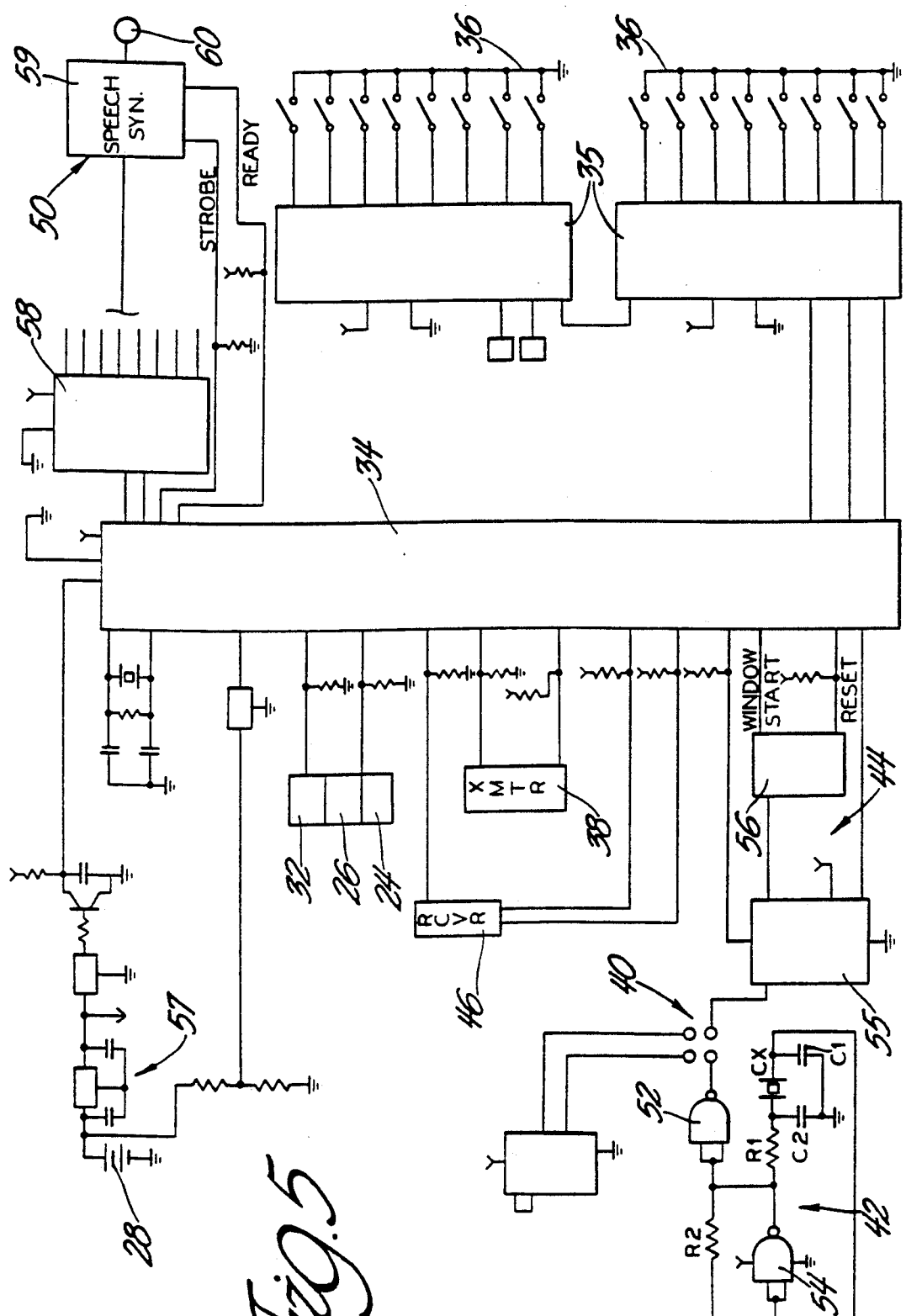
FIG. 5 is a circuit diagram of the transponders.

The transponder 14 utilizes the specific circuitry illustrated in FIG. 5. The clock means 42 includes crystal oscillator means comprising a circuit comprising an oscillator crystal CX operating at 32.76 KHz connected to a pair of parallel capacitors C1, C2 to ground. The oscillator CX is connected through a resistor R1 to the input of an NAND gate 52 and the output of a second NAND gate 54, which has its inputs connected to the other side of the crystal oscillator CX and through a resistor R2 to the inputs of the first NAND gate 52. The output of the first NAND gate 52 produces the clock signal at 32 KHz which is sent to the window timer means 44. The window timer means 44 includes a divider circuit 55 having a reset input, clock input and two outputs. A first output Q12 indicating start of a window goes to the clock input of a flip flop 56 having a Q' output and a reset input. The flip flop 56 produces the start of window signal to the controller 34, and is reset by the controller 34 once the functions have been completed. The second output of the divider circuit 55 produces the middle of the window signal to the controller 34. The reset input of the divider circuit 55 occurs as a result of reception of the sync signal to maintain synchronization.

The controller 34 includes a microcomputer of the type MC68HC70568. The microcomputer 34 includes reset outputs which are connected to the resets of the divider circuit 55 and flip flop 56. The microcomputer 34 receives the middle of the window signal along with a start window signal. The pair of shift registers 35 each include eight outputs connected to the manual selectable switches 36 for identifications. The output of the second series of shift register 35 produces the identification number to the transponder controller 34 in serial form. A clock is provided for the shift register from the microcomputer 34. The microcomputer 34 includes an audio output which transmits an audio signal to the audio means 50. A watchdog timer 57 is provided at the reset of the microcomputer 34 for resetting same at predetermined time intervals to ensure proper operation. Furthermore, the microcomputer 34 includes a sensor input for the separation switch 26 and the emergency button 24. A battery input receives the low battery signal. The radio receiver 46 and transmitter 38 are connected to the microcomputer 34 to communicate received signals, and transmit data signals, and control the power thereto. The receiver 46 and transmitter 38 are of the type 900 MHz FSK link using a two gain AGC and received signal strength indicator. The microcomputer 34 includes an output to turn on and control the power of the receiver 46, and to turn on and control the power to the transmitter 38. Furthermore, the microcomputer 34 includes an output data signal to the transmitter 38. An input signal is received from the receiver 46 along with a carrier detection signal.

The transponder 14 includes a speech and synthesizer board 59 connected by a serial to parallel converter 58 to the controller 34. The audio signal containing the audio message is formed in the controller 34 and sent through the converter 58 to the synthesizer board 59. The synthesizer board 59 is connected to an earphone 60 for the user can obtain the message. The serial to parallel converter 58 is of the type commonly known in the art. The speech synthesizer board 59 is of the type TC8833F by Toshiba and EPROM.

Figure 8:
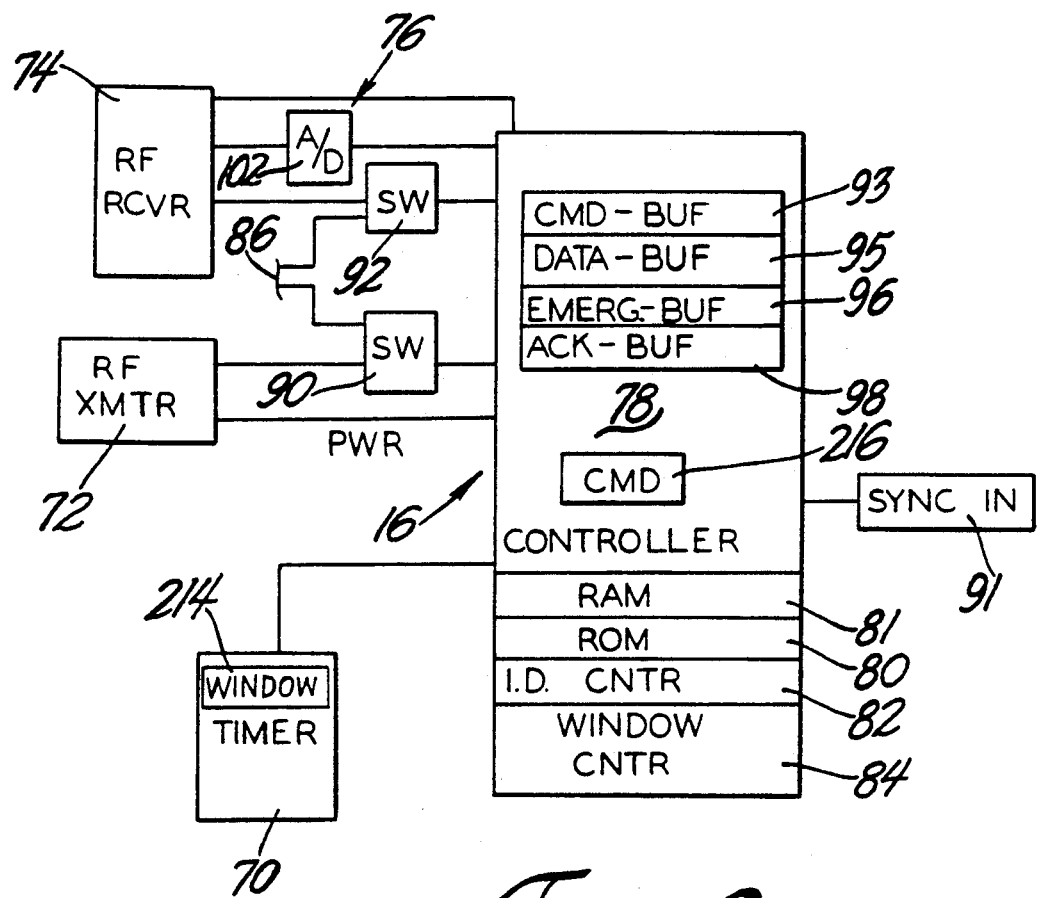
FIG. 8 is a detailed block diagram of the transceiver.

The transceiver 16 is generally illustrated in FIG. 8 and receives a data signal from the transponders 14 and identifies which of the plurality of transponders 14 are transmitting and the signal strength thereof, and communicates the information to the control means 20. Each of the transceivers 16 includes timing means 70 for establishing sequential time windows associated with each of the transponders 14. The timing means 70 is configured as the transponder timing means 40. Such time windows and timing means 70 are synchronized with the transponders 14.

The transceivers 16 are generally connected to the structure 18 by suitable means, such as fasteners, and is hard wired to the control means 20. The range of the transceivers 16 determines placement thereof in the structure such that overlap in the r.f. range between transponder 14 and transceiver 16 occur.

The transceiver 16 includes command transmitter means 72 for transmitting the command signal or audio signal over radio frequencies to the transponders 14. The form of the command signal was discussed previously with respect to the transponders 14. Location receiver means 74 receives the data signal transmitted by the transponders 14 over radio frequencies. The data signal is measured for signal strength by measuring means 76. A transceiver controller 78 receives comtmands from the control means 20 for continued communication to the transponders 14 through the transmitter means 72. The controller 78 also receives beginning of the window and middle of the window signals from the timing means 70. The controller 78 operates under program code stored in ROM memory 80 according to the flow chart illustrated in FIG. 10. A RAM memory 81 stores variables used in the programming, i.e., total number of transponders indicative of the number of time ranges in a cycle. The transceiver controller 78 also receives the measurement signal from the measurement means 76 indicative of signal strength.

A command buffer 93 stores the command signal from the control means 20 during the previous cycle. A data buffer 95 stores the data information from the transponder 14 for status data signal, while an emergency buffer 96 stores the emergency data information, and an acknowledge buffer 98 stores acknowledge information transmitted by the transponders 14.

The controller 78 includes identification counter means 82 for counting the time ranges in a cycle for comparison to the identification numbers of the 2 bytes in the data signal associated with each transponder 14. The controller means 78 also includes window counter means 84 for cyclically counting one to eight upon each beginning of window signal, whereupon each complete cycle increments the identification counter means 82. The controller 78 compares the identification counter means 82 to the received identification number to ensure that the proper transponder 14 is transmitting in the proper sequence, and to validate the information associated with the transponder 14 prior to communication same to the control means 20. The controller 78 produces an information signal which sets forth the transponder identification number, battery status, emergency status, audio acknowledge, and signal strength. The information signal is transmitted over an RS422 transmission cable 86 to the control means 20. Each transceiver 16 is separately hard wired and connected to the control means 20 in parallel, as subsequently.

The controller 78 receives from the control means 20 audio command signal which is received during the transmit or fourth window for inclusion in the command signal for a transponder 14. The transceiver 16 can receive an audio command signal from the control means 20 for any transponder 14 during any specified time range during communication in the fourth window.

The transceiver 16 includes transmission switch means 90 for receiving coded signals from the controller 78 and for selecting transmission of the signal via the cable 86 to the control means 20 or via the r.f. transmitter 72. Also included is receiver switch means 92 for selectively receiving signals from either the r.f. receiver 74 or from the control means 20.

The transceiver 16 is synchronized to the control means 20 via a separate synchronization line 91 directly wired to the control means 20 which provides the initialization/sync signal.

More specifically, the transceivers 16 transmit data to the control means 20, based on the received information, up to eleven bytes per transmission, coded as follows: bytes 1 and 2 are general coding for system identification; byte 3 includes bits 0 and 1 indicating high bits of transponder number for counting at controller, bit 2 is set at 1 if emergency bytes are to follow, bit 3 is set at 1 if audio acknowledge bytes are to follow, bit 4 is always set to 0, bit 5 indicates low battery when set, bit 6 indicates emergency condition when set, bit 7 indicates audio acknowledge when set; byte 4 indicates the low byte of the transponder number; byte 5 indicates the non-emergency signal strength code; byte 6 includes bits 0 and 1 indicating the high bits of emergency transponder number, bits 2–4 are always 0, bit 5 is set when low battery, bit 6 is set when emergency exists, and bit 7 is set when audio acknowledge; byte 7 indicates the low byte of the emergency transponder number; byte 8 indicates the emergency signal strength code; byte 9 includes bits 0 and 1 as the high bits of the audio acknowledge transponder number, bits 2–4 are 0, bit 5 is set when low battery, bit 6 is set when emergency, and bit 7 is set for audio acknowledge; byte 10 indicates the low byte of the audio acknowledge transponder number; and byte 11 indicates the audio acknowledge signal strength byte.

When sending information to the control means 20 in response to a reception, transceivers 16 transmit bytes 1-5 based on received data. Additional bytes 6-8 are utilized only if an emergency exits and bit 2 of byte 3 is set. Additional bytes 9-11 are utilized only if an audio acknowledge has been received and bit 3 of byte 3 is set. This additional information is only utilized and transmitted when necessary, and therefore transmission time is minimized. Any combination of the emergency and acknowledge information may be provided with the general data.

The data from the control means 20 to the transceivers 16 includes a seven byte data stream. Bytes 1 and 2 are general coding. Byte 3 includes the command information comprising reset, audio, ready to reset, send continuous, and the transponder number. Byte 4 includes the high byte of the transponder number, byte 5 includes the low byte of the transponder number, byte 6 is the zone number for audio, and byte 7 is the area number for audio. This information is utilized to transmit commands to the transponders 14, and each field has been previously discussed.

FIG. 7 illustrates the functions occurring during the specified windows in each time range corresponding between control means 20, transceivers 16, and transponders 14. When the first window signal is received, the transceiver controller 78 transmits r.f. commands to the transponders 14 based on previously received information received during the previous time range cycle. During the second window, nothing occurs. During the third window, the transceiver 16 looks for audio acknowledge signals form a transponder 14. During the fourth window, the controller 78 receives information or commands from the control means 20. During the fifth window, the r.f. receiver 74 is powered to receive the data signal from the transponder 14. During the sixth window, the controller 78 looks to receive the sync signal from the control means 20 and resets its timing and the transponder timing. During the seventh window, the r.f. receiver 74 is powered to receive any emergency transmissions from any transponder 14. During the eighth window, the controller 78 transits status information to the control means 20, and transmits the sync signal to the designated transponder 14.

Figure 10A:
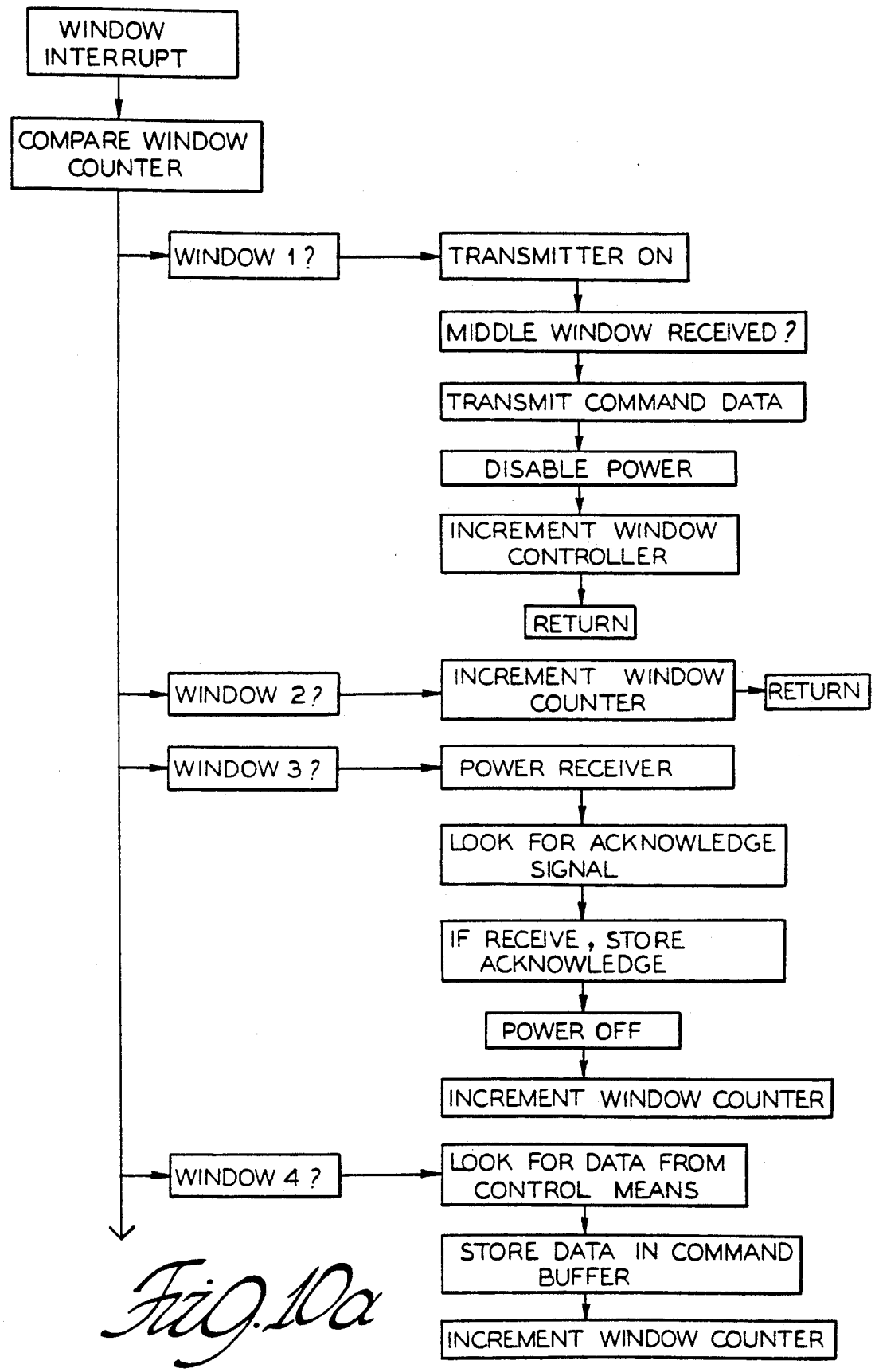
FIGS. 10a and 10b are a flow chart of the transceiver processor.
Figure 10B:
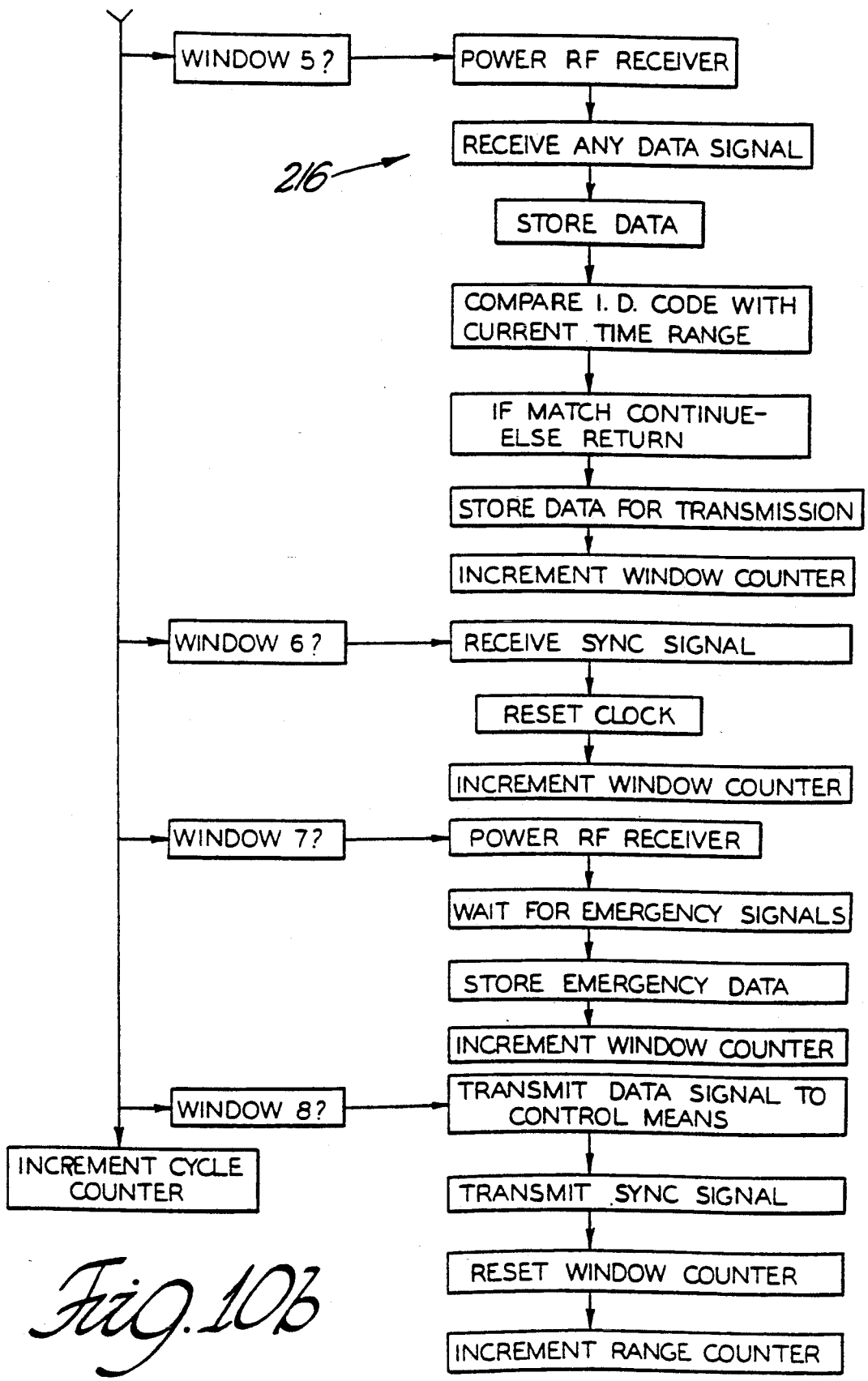

The controller 78 and therefore transceiver 14 operates under the flowchart illustrated in FIGS. 10a and 10b. The timing means 70 produces the beginning of window and middle of window signals. The transceivers 16 are initialized to set all on the same synchronization from the control means 20 and to set the counters 82, 84 in sync. Upon receiving the beginning of window signal with the window counter 84 indicating the first window, the controller 78 turns on the r.f. transmitter 72 and formats the information in the command buffer 93 for subsequent transmission. Upon reception of the middle of window signal, the command data is communicated to the transmitter 72 by switching the transmit switch means 90. Thereafter, power is disabled to the transmitter 72 and the window counter 84 incremented and the command buffer contents cleared. Upon receiving the beginning of the window signal and middle of window signal for the second window, only the window counter 84 is incremented.

Upon receiving the beginning of window signal for the third window, the receiver 74 is powered for the duration of the window or until the acknowledge data signal is received. If an acknowledge signal is received, the information is stored in the acknowledge buffer 98, and the window counter 84 incremented.

Upon receiving the beginning of window signal for the fourth window, the receiver switch means 92 is switched to receive data from the control means 20. Upon receiving any data, the data is stored in the command buffer 93, and window counter 84 incremented.

Upon receiving the beginning of window signal for the fifth window, the receiver switch means 94 is switched to receive the information from the r.f. transmitter 72 and the transmitter 72 is powered for the duration of the window or until after all data is received, whichever is earlier. If information is received, the controller 78 stores the status data in the data buffer 96. The controller 78 compares the transponder identification code to the identification counter 82 to validate the transmission, otherwise ignores the information if not validated. Upon reception of the beginning of window signal for the sixth window, the sync signal is received to resynchronize the timing means 70, and window counter 84 incremented. Upon reception of the beginning of window signal for the seventh window, the r.f. receiver 74 is powered for the window duration and the receive switch means 94 accordingly set. The controller 78 awaits for reception of any emergency data signals. If received, the information is stored in the emergency buffer 96. Upon receiving the beginning of window signal for the eighth window, the controller 78 formats the status/data signal for communication to the control means 20 from the buffers 95, 96, 98. When the middle of window signal is received, the controller 78 transmits the information over the cable 86 to the control means 20 by selecting the transmit switch means 92. The buffers 95, 96, 98 are cleared, the window counter 84 set to zero (first window), and the identification counter means 82 is incremented. Additionally, the sync signal is sent to the transponder 14 associated with the present time range if requested by the control means 20. The sync signal is transmitted only periodically or selectively, and is not transmitted during each eighth window, i.e., once a day.

Figure 9:
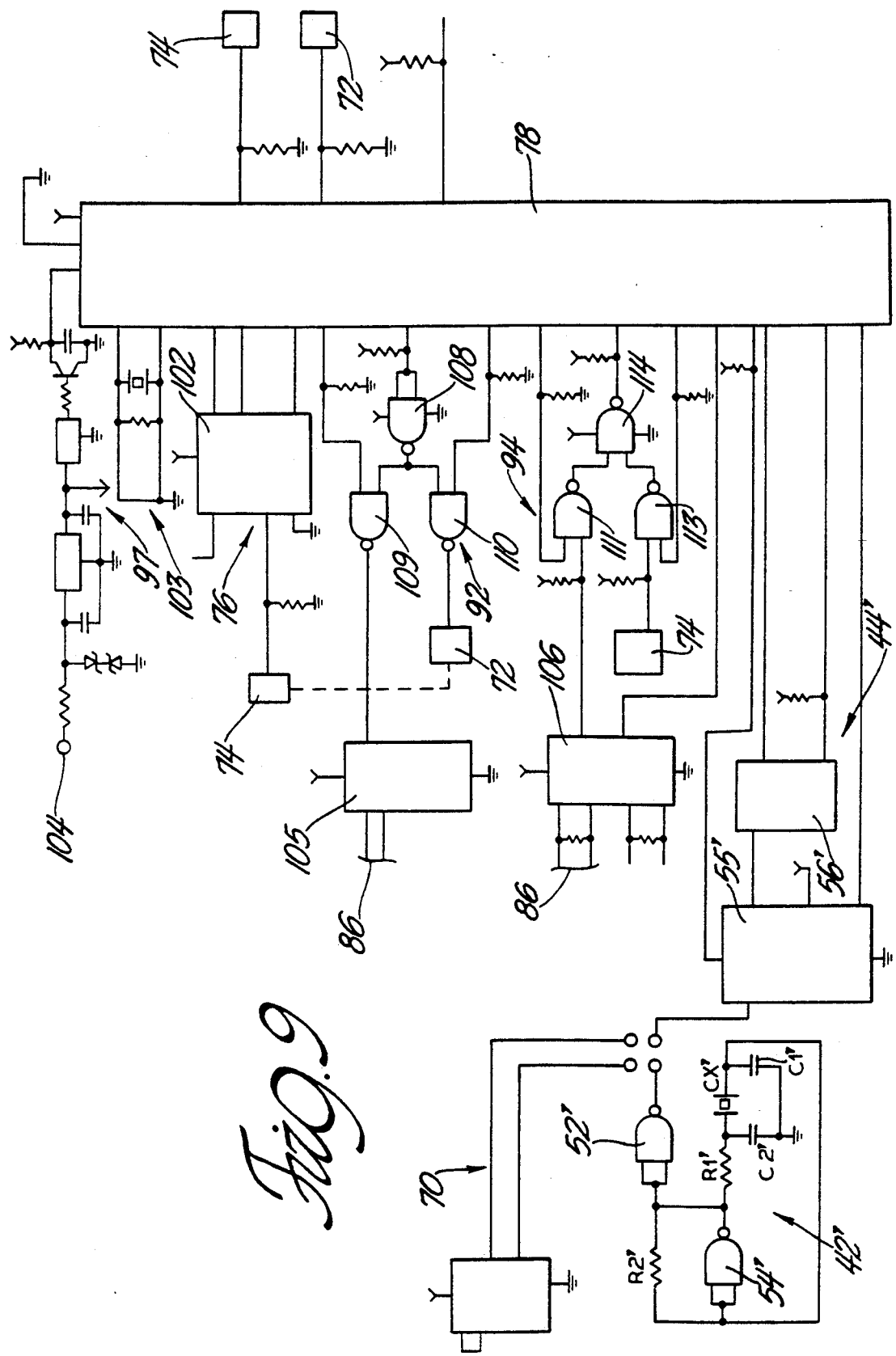
FIG. 9 is a circuit diagram of the transceiver timer.

The specific circuitry of the transceivers 16 is illustrated in FIG. 9. The timing means 70 is configured the same as the transponder timing means 40 and includes primed reference numerals corresponding thereto. The controller 78 comprises a microcomputer of the type MC68HC705C8. The r.f. receiver 74 is generally of the type 900 MHz FSK link. The r.f. receiver 74 produces a received data signal to the receiver switch means 94 and receives a power control signal from the controller 78 to control powering thereof. The receiver 74 also produces a carrier detect signal to the controller 78 indicating reception of the r.f. signal. The r.f. transmitter 72 is comprised as part of the r.f. receiver board. The transmitter 72 receives the command signal from the controller 78, and also a power control signal to control powering thereof. The measuring means 76 includes an analog to digital converter 102 for receiving the analog signal strength from the receiver 74 and producing a digital representative thereof to the controller 78. The analog to digital converter 102 is of the type ADC0831.

A controller timer 103 is connected to the controller 78 and is crystal controlled for establishing the controller clock. Power supply from the control means 20 is separately hardwired directly to each transceiver 16 and is received at line 104, and connected through a reset circuit 97 including a voltage regulator to the controller 78. A driver 105 is connected to the transmitter switch means 92 to receive the status signals and communicate same along the cable 86 to the control means 20. The driver 105 is of the type AM26L831 (RS422 Driver). A cable receiver 106 receives the serial command signal from the control means 20 on the RS422 cable 86, and receives the sync signal. The cable receiver 106 communicates the received signal to the receiver switch means 94, and directly communicates the sync signal to the controller 78.

The transmitter switch means 92 includes a dual input NAND gate 108 having inputs from the controller 78 to select transmission. A pair of dual input NAND gates 109, 110 each include a separate input receiving the transmitted data from the controller 78, and an input from the output of the first NAND gate 108. The outputs of the NAND gates 109, 110 produce the status data for the driver 105 and the command signal for the r.f. transmitter 72, respectively.

The receiver switch means 94 includes a pair of NAND gates 111, 113 each receiving as one input the r.f. received signal from the r.f. receiver 74 and the cable command received signal from the receiver driver 106, respectively, and a second input is received as control thereof from the controller 78. The output of the NAND gates 111, 113 are fed to a dual input NAND gate 114, whose output provides the serial data for the controller 78.

Figure 2:
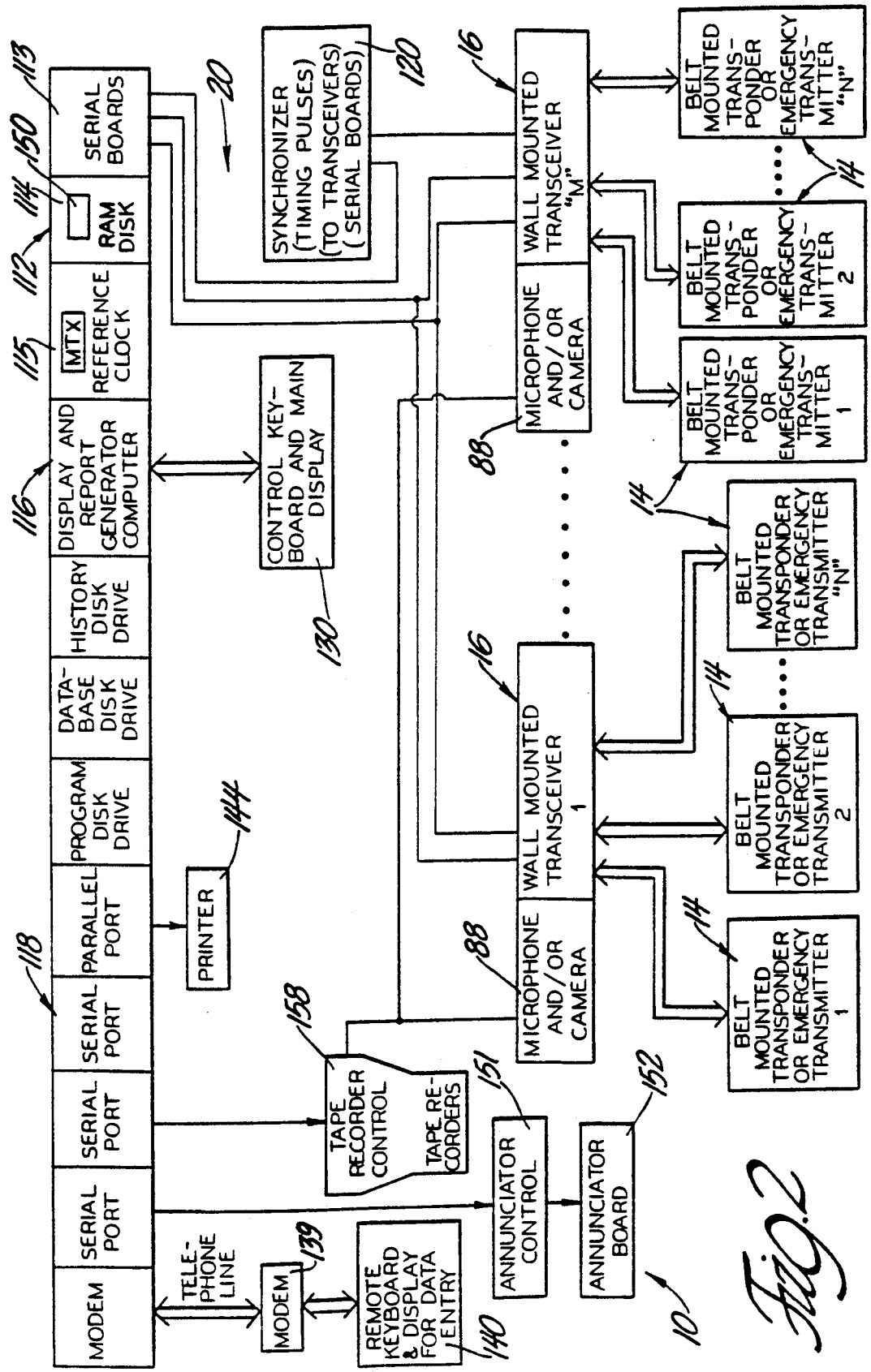
FIG. 2 is a block diagram of the subject invention.

The transceiver 16 also includes a microphone 88 (FIG. 2) attached thereto and independently hardwired to the control means 20 for monitoring emergency conditions and transmitting same to the control means 20. Alternatively or in addition thereto, a camera may be connected to allow visual monitoring of the emergency when it arises.

The control means 20 includes a serial computer 112 with RAM disk 114, display and report generator computer 116, data base and history computer 118, and synchronizer 120. It should be understood that a single computer may be utilized to implement the functions described. The computers operate as a whole under the flow chart illustrated in FIG. 12.

Figure 12A:
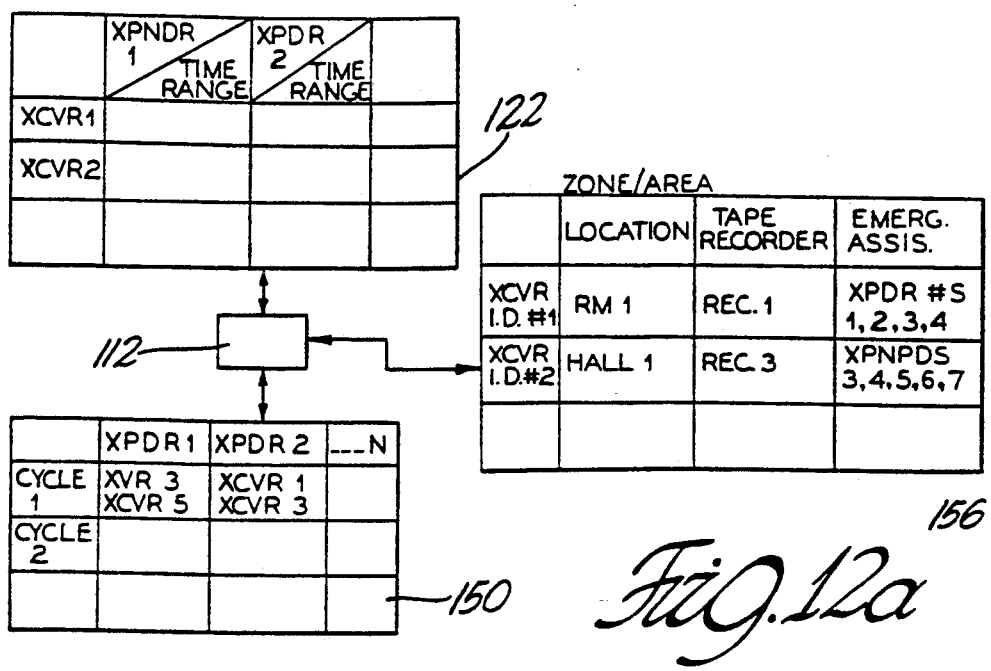
FIGS. 12a, 12b and 12c illustrate the memories of the control means.
Figure 12B:
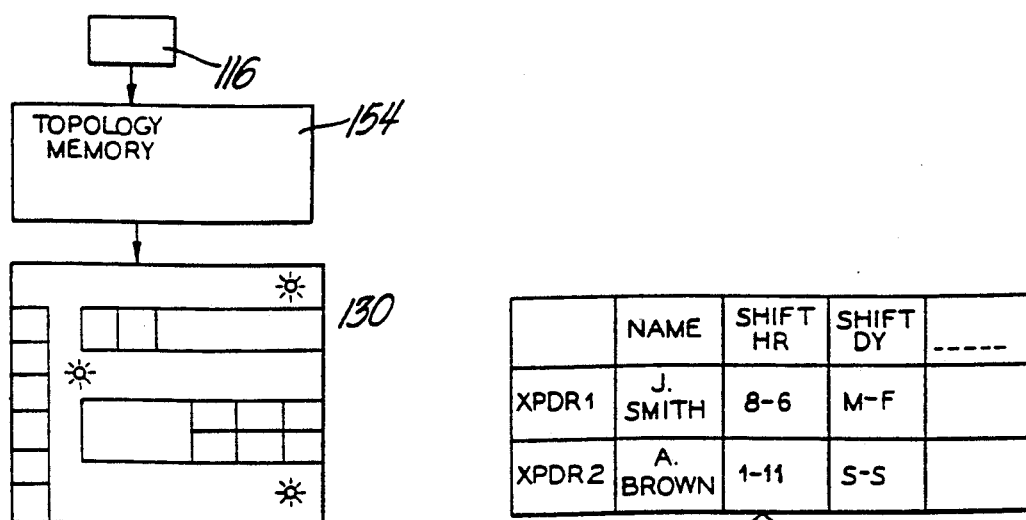

The information signal from each transceiver 16 is sent to the serial computer 112 through serial boards 113 and all information is stored in the RAM disk 114. The information from each transceiver 16 is connected and collected in parallel. The serial computer 112 handles in real time all received signal strengths from the transceivers 16 based on internal clock 115, tracks the location of transponders 14, and accomplishes the voting based on signal strength. The serial computer 112 is synchronized with the transceivers 16 and transponders 14 by the synchronizer 120. The serial computer 112 includes a matrix memory 122 in the RAM 114 for storing the available locations of each transponder 14 with identification number and associated sequence time range with respect to each transceiver 16 to detect spurious readings and/or improper operation of a particular transponder 14. A bit of 0 indicates a location not valid and a bit of 1 indicates valid location. The form of the memory 122 is illustrated in FIG. 12a.

The serial computer 112 examines the matrix 122 and sees if any transponder 14 is out of place. The computer 112 eliminates spurious readings. The RAM 114 stores information for one cycle. Upon the second cycle, the computer 112 makes sure that the signal is relatively consistent and there is not spurious data.

Each of the transceivers 16 are hardwired to the data serial board 113, which board is polled by the serial computer 112. The computer 112 places a transceiver identification number at each port on the data board 113 for identifying the transceiver 16 and its location. The serial computer 112 each line to determine, during a single time range, which transceiver 16 has transmitted an information signal indicating that the transceiver 16 had received a data signal. Each of these information are stored in a separate buffer 150 categorized with each particular transponder 14 with the transceiver number identified therewith and information transmitted thereby until after reception of a second information signal during the next cycle. If a second information signal is received from the same transceiver 16 the serial computer 112 compares all of the information signal with respect to their signal strength, and stores the transceiver identification number, along with its information on its RAM disk 114 based on the transponder identification number based on the stronger signal strength. This information is transmitted to the data base and history computer 118 and display and report generator computer 116 upon verification after two cycles.

If during a time range, no information is received, the serial computer 112 determines the identification number of the non-transmitting transponder 14 based on its real time clock and synchronization with the transceivers 16. The serial computer 112 transmits this information to the display and report generator computer 116. For example, during time range 1, the computer 112 knows that a transponder 14 has been assigned the time range 1. Therefore, if no data signal is received during that time, a problem or emergency is detected and acted upon.

When a transceiver 16 transmits an emergency information signal or absence of any transmission, the serial computer 112 identifies the identity of the transceiver 16 and transmits this information to the display and report generator computer 116 notifying such of an emergency condition and the location thereof based on the transceiver 16.

When an emergency signal is received, the serial computer 112 obtains a predetermined number of transponders 14, i.e., fifteen, by identification number, which are located within the area of the emergency or of a special unit. This information is provided in memory 156 (FIG. 12a). Upon obtaining this, the serial computer 112 transmits the audio code bit and zone and area code of the emergency to each selected transponder 14 during sequential time ranges via transceivers 16. The serial computer 112 looks for the audio acknowledge bits in return in subsequent time ranges. The computer 112 includes area memory 154 for storing the possible areas and zone codes, which can be associated with the location of the emergency signal to direct the other personnel to the location.

The display and report generator computer 116 is connected to a control keyboard and main display screen 130. The computer 116 drives the display screen 130 from system operation. The screen 130 displays the topology of the structure or facility 18 and the location of each transponder 14 (zone/area) while highlighting emergencies of any transponder 14 by red color coding. The computer 116 develops management reports of emergency incidents, location, time, time of inception and time of cancellation.

The topology of the structure for a facility 18 is stored in graphics memory 154 of the computer 116 (FIG. 12b) wherein the fixed location of each transceiver 16 is stored in location memory 156 and associated by identification number. When an emergency is detected, the display screen 130 may visually display the general location of the transceiver 16 which receives the strongest signal strength, i.e., by red color or blinking action. During an emergency, the display and report generator computer 116 turns on tape recorders 158 which are connected to the microphone 88 located in the general vicinity of the emergency. The tape recorders 158 will remain on until the emergency has been eliminated. The display and generator computer 116 may continuously display the movement and location of each transponder 14 on the display screen 130. The computer 116 receives each update of transponder 14 location from the serial computer 112 in order to update any change in position based on change in signal strength or change in transceiver 16, or an update on status thereof to emergency.

Figure 12C:
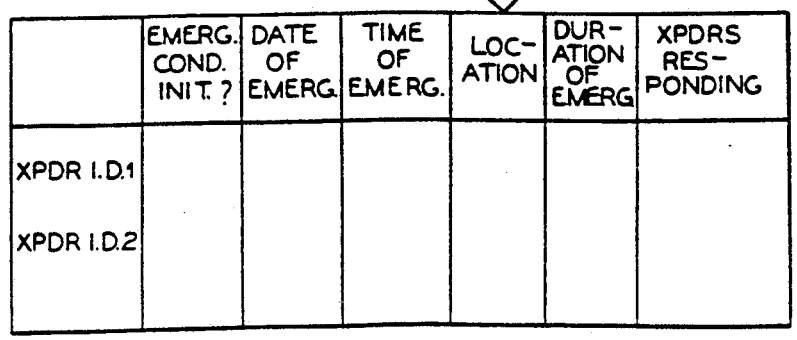

The database and history computer 118 is connected through a modem 139 to a remote keyboard and display 140 for data entry. The keyboard and display 140 is utilized for inputting transponder 14 assignments to personnel 12, e.g., transponder identification number versus personnel identity, and other system variables in an identification memory 160 (FIG. 12c).

The database and history computer 118 stores the information regarding the month of operation and performs archival in a history memory 162. Such information includes which transponder 14 and personnel initiated the emergency, date and time of an emergency, position of personnel or guards, and diagnostic equipment problems as illustrated in FIG. 12c a printer 144 prints out all information upon request by the remote keyboard 140.

An annunciator control 151 and annunciator board 152 may be used in conjunction with the assembly 10. The annunciator control 150 and board 152 are commonly used in present prison systems, and may be more accurately utilized with the control means 20 to indicate location and emergency, controlled by the computer 118.

Figure 11:
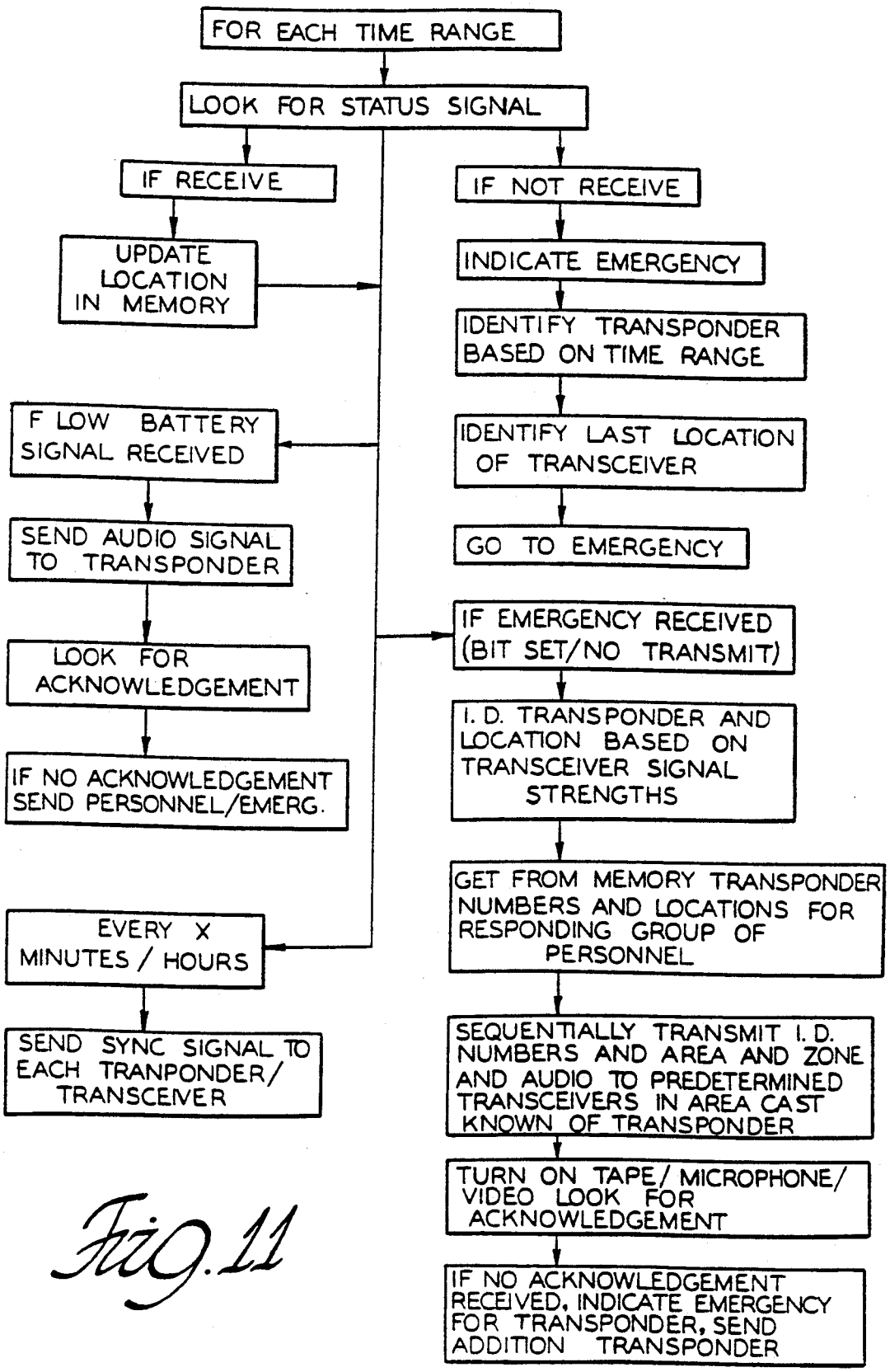
FIG. 11 is a flow chart of the control means.

A synchronizer 120 is located at the control means 20 and synchronized therewith. It provides the synchronization signals to the transceivers 16 and nest 31. The synchronizer 120 further establishes the sequence of transmission by the transceivers 16 of the command signals such that interference does not occur. The synchronizer 120 comprises a simple clock and produces a synchronizing signal periodically to update the control means 20, transceivers 16 and transponders 14. The general flow chart of the control means 20 is illustrated in FIG. 11.

After each time range, the control means 20 looks for the status signals at each transceiver input. If no signals are received, the control means 20 determines which transponder 14 is associated therewith by memory 122, and the last location thereof by memory 150 and stored history. If status signals are received, the information including transceiver identification are stored in memory 150 and compared to a second cycle of received information to ensure a spurious reading was not received. The location is determined by the transceiver 16 with the greatest signal strength. Alternatively, the location can be more accurately determined as according to U.S. Pat. No. 4,494,119 to Wimbush, and assigned to the assignee of the subject application The location and information thereafter updates the history computer 118. The main display 130 and annunciator 152 are updated to indicate visual position. If a low battery indication is received or an emergency signal on a specified transponder 14, the location of the transponder 14 is determined based on the most recent signal in history and stored. The responding emergency unit is obtained from memory 156 which obtains the transponder identification numbers of those personnel responding to the emergency. The control means 20 determines the last known location of each transponder 14 and transmits the command signal indicating emergency and specifying each transponder concurrently or sequentially, depending on the location of each transponder 14. The control means 20 identifies which transceivers 16 are in an area of the transponder 14 by memory 150 and can instruct only those transceivers 16 to transmit the command signal to the selected transponder 14. Concurrently, a different set of transceivers 16 out of range of the former set, may transmit the emergency command signal to another selected transponder 14. Transponders 14 who may overlap ranges of a similar transmitting transceiver 16 are sent command signals sequentially during sequential time ranges. Thereafter, audio acknowledges for each transponder 14 are expected.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A monitoring assembly, said assembly comprising:
a plurality of transponder means (14) for transmitting a data signal and receiving a command signal;
transceiver means (16) for receiving said data signal and identifying which of said plurality of transponder means (14) is transmitting;
each of said transponder means (14) including timing means (40) for establishing cycles of sequential time ranges wherein each time range is associated with each of said transponder means (14) and occurs at least once during each cycle and for dividing each of said time ranges into at least two time windows for allowing reception of said command signal during one of said time windows by said transponder means (14) associated with said time range and for allowing automatic transmission of said data signal during the other of said time windows by said transponder means (14) only associated with said time range and during each cycle independent of receiving said command signal.

2. An assembly as set forth in claim 1 further characterized by said timing means (40) including clock means (42) for generating a clock signal.

3. An assembly as set forth in claim 2 further characterized by said timing means (40) including total buffer (39) for storing the total number of transponder means (14) in said assembly, and an identifier buffer (35) for storing the sequence number identified with one of said total number associated with said transponder means (14), said sequence number being unique to each of said transponder means (14).

4. An assembly as set forth in claim 3 further characterized by said timing means (40) including window means (44) for receiving said clock signal and for dividing said clock signal into said time windows producing a window signal at the start of each of said time windows.

5. An assembly as set forth in claim 4 further characterized by said transponder means (14) including transmitter means (36) for receiving said data signal and transmitting same over radio frequencies.

6. An assembly as set forth in claim 5 further characterized by said transponder means (14) including receiver means (52) for receiving said command signal over a radio frequency link.

7. An assembly as set forth in claim 6 further characterized by said transponder (14) including emergency switch means (24) for manual actuation to produce an emergency signal in response thereto.

8. An assembly as set forth in claim 7 further characterized by said transponder means (14) including separation means (26) for sensing separation of said transponder means from an object and for producing a separation signal in response thereto.

9. An assembly as set forth in claim 8 further characterized by said transponder means (14) including a battery supply means (28) for maintaining a charge and supplying power, and including battery sensor means (32) for sensing charge on said battery supply means (28) and for producing a battery signal when said charge falls below a predetermined magnitude.

10. An assembly as set forth in claim 9 further characterized by said transponder means (14) including controller means (34) for producing said data signal based on said emergency signal and said sequence number and for communicating said data signal to said transmitter means (36) upon reception of said window signal.

11. An assembly as set forth in claim 10 further characterized by said controller means (34) including coding means for receiving said emergency signal and said battery signal and said separation signal for producing said data signal in the form of binary coding.

12. An assembly as set forth in claim 11 further characterized by said controller means (34) including range counter means (41) for receiving a total number signal and for counting the window signals to indicate a number representative of the current time range.

13. An assembly as set forth in claim 12 further characterized by said controller means (34) including window counter means (43) for receiving said window signals and for counting to indicate the sequence number of the current window.

14. An assembly as set forth in claim 13 further characterizes by said controller means (34) including comparing (210) means for comparing the transponder sequence number with the current sequence number and if equivalent to allow transmission of said data signal during a first predetermined window.

15. An assembly as set forth in claim 14 further characterized by said controller means (34) including emergency (212) for allowing transmission of an emergency signal by any transponder during a second predetermined window in response to said emergency signal irrespective of the current sequence number.

16. An assembly as set forth in claim 13 further characterized by said transponder means (14) including audio transducer means (50) for receiving an audio signal and producing audible communication.

17. An assembly as set forth in claim 16 further characterized by said timing means (70) including oscillator means (cx) for producing a clock signal.

18. An assembly as set forth in claim 7 further characterized by said transponder means (14) including controller means (34) for receiving said emergency signal and for producing a data signal and for communicating said data signal to said transmitter means (36) during a predetermined window of any of said time ranges irrespective of the time range associated with said transponder means.

19. An assembly as set forth in claims 1 further characterized by said transceiver means (16) including timing means (70) for establishing sequential time ranges synchronized with said transponder means (14).

20. An assembly as set forth in claim 19 further characterize by said timing means (70) including window means for producing a window signal upon the start of each window synchronized with said transponder means (14).

21. An assembly as set forth in claim 20 further characterized by said transceiver means (16) including receiver means (74) for receiving said data signal.

22. An assembly as set forth in claim 21 further characterized by said transceiver means (16) including analog to digital converter means (102) for receiving said data signal and for measuring the signal strength producing the signal strength signal.

23. An assembly as set forth in claim 22 further characterized by said transceiver means (16) including command transmitter means (72) for transmitting said command signals and said audio signals over radio frequencies to said transponder means (14).

24. An assembly as set forth in claim 23 further characterized by including control means (20) for receiving said information signal and for displaying the location of said transponder means (14) and for producing said audio command signal.

25. An assembly as set forth in claim 19 further characterized by said transceiver means (16) including transceiver controller means (78) for storing a pointer number with an associated identification number of each transponder means (14) for receiving said data signals and for identifying one of the plurality of transponder means (14) based upon matching of said identification number with said data signal.

26. An assembly as set forth in claim 19 further characterized by said transceiver means (16) including transceiver controller means (78) for storing a pointer number for identifying a time range within a cycle of time ranges during which said data signal is received to identify which one of said plurality of transponder means is transmitting and associated with said time range.

27. A monitoring assembly for monitoring mobile objects (12), said assembly comprising:
control means (20) for producing an audio control signal indicative of audio information;
transceiver means (16) for receiving said audio control signal and for transmitting over radio frequencies a command signal indicative thereof and for receiving a data signal;
a plurality of transponder means (14) having an identification code associated therewith and for transmitting a data signal and for receiving said command signal including an identification number;
said transponder means (14) including audio transducer means for receiving said command signal and for providing audible communication to the association mobile object based on said command signal when said identification code equals said identification number.

28. A method of monitoring a source of transmission, the method including the steps of:
periodically transmitting a data signal during preassigned time ranges:
receiving the data signal and identifying which of the sources of transmission is transmitting based on the pre-assigned time range;
establishing cycles of sequential time ranges wherein each time range is associated with a different source of transmission and occurs at least once during each cycle;
an dividing each of said time ranges into at least two time windows for allowing reception of a command signal during one of the time windows by a mobile object and for allowing transmission of the data signal during the other of the time windows by the source of transmission only associated with the time range during each cycle independent of receiving said command signal.

* * * * *